United States Patent [19]

Sibeud

[11] 4,079,638
[45] Mar. 21, 1978

[54] DEVICE FOR THE AUTOMATIC OR MANUAL SELECTION OF THE RATIO OF A GEARBOX ON A MOTOR VEHICLE

[76] Inventor: Jean-Paul Sibeud, Chaponnay (Rhone), France

[21] Appl. No.: 561,247

[22] Filed: Mar. 24, 1975

[30] Foreign Application Priority Data

Mar. 26, 1974 France .................................. 74 11844

[51] Int. Cl.² ............................................. B60K 21/00
[52] U.S. Cl. ..................................................... 74/866
[58] Field of Search .......................... 74/336, 337, 866; 192/.052, .092, .033

[56] References Cited

U.S. PATENT DOCUMENTS

| | | | |
|---|---|---|---|
| 3,435,713 | 4/1969 | Pfisterer et al. | 74/866 |
| 3,645,366 | 2/1972 | Numazawa et al. | 192/.092 X |
| 3,665,779 | 5/1972 | Mori | 74/866 |
| 3,673,892 | 7/1972 | Kato et al. | 74/866 X |
| 3,709,068 | 1/1973 | Mohri | 74/866 |
| 3,733,930 | 5/1973 | Mizote | 74/866 |
| 3,834,499 | 9/1974 | Candellero et al. | 192/.033 X |
| 3,885,472 | 5/1975 | Wakamatsu et al. | 74/866 |

FOREIGN PATENT DOCUMENTS

| | | | |
|---|---|---|---|
| 2,172,622 | 9/1973 | France | 192/.052 |
| 2,048,400 | 4/1971 | Germany | 74/866 |

Primary Examiner—James F. Coan
Attorney, Agent, or Firm—Irving M. Weiner; Pamela S. Austin

[57] ABSTRACT

A device for selecting the ratio of the gearbox on a vehicle. The ratio is selected by electronic means which include a system for putting the engine speed under the control of the shaft speed, a system defining the ratios allowed, a system for introducing a parameter imposed by the driver, and a safety system with display and alarm means. Electronic memory devices permit taking into account the operating conditions of the engine. The device permits automatic or manual selection of a gearbox ratio corresponding to the greatest allowed ratio.

4 Claims, 2 Drawing Figures

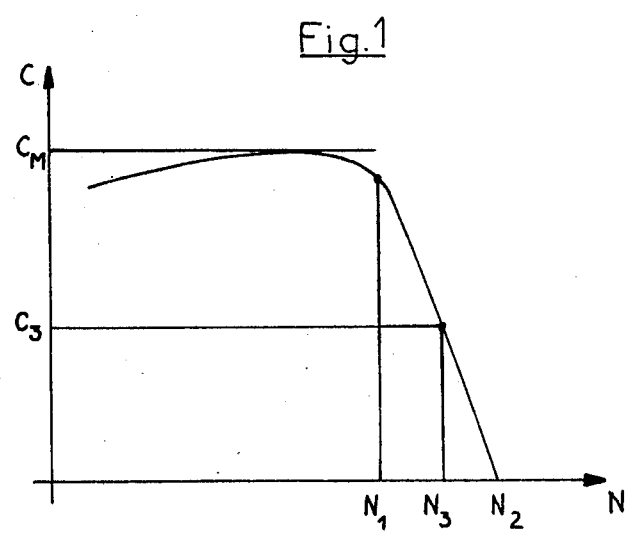

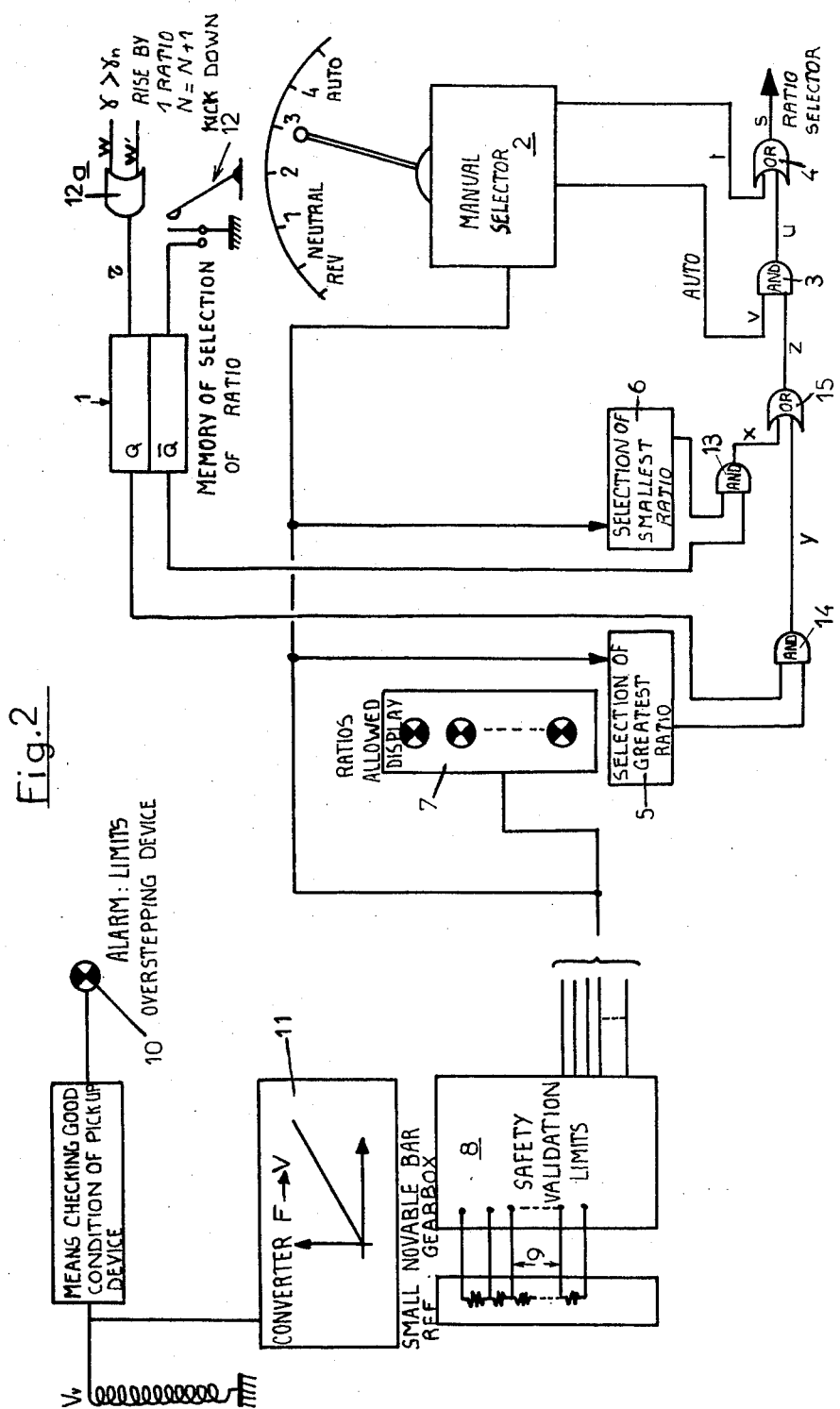

DEVICE FOR THE AUTOMATIC OR MANUAL SELECTION OF THE RATIO OF A GEARBOX ON A MOTOR VEHICLE

The present invention relates to a device for selecting the ratio of a gearbox of a vehicle. In particular, the present invention relates to a device for selecting the ratio of a direct drive gearbox of a conventional type on a motor vehicle with a mechanical clutch also of a conventional type.

BACKGROUND OF THE INVENTION

The engines of heavy trucks and lorries have ranges of speeds which can be used only within very narrow limits (from 1000 to 2500 RMP), and are associated with gearboxes which have a substantial number of gear ratios, offering total reduction possibilities usually from 1 to 10. This allows using the engine correctly, the low power per unit of mass in such vehicles being taken into account.

A mistake in the ratio to be used as a function of the speed of the vehicle may result in the engine running under very abnormal and destructive conditions.

In the case of a touring car with semi-automatic control, the low number of ratios (4), the small range of reduction of the gearbox (from 1 to 4), and the very wide range of engine speeds (from 1000 to 5000 RPM) which can be used, make it unlikely for the engine to be destroyed by running under abnormal conditions as a result of a mistake in the use of the gearbox. On the other hand, when it is contemplated to go through the gears automatically on a heavy truck or lorry, safety devices against wrong handling are absolutely necessary.

The device according to the present invention aims at solving this problem by allowing the selection of the ratio of the gearbox of a vehicle, either manually or automatically.

SUMMARY OF THE INVENTION

The present invention provides a device for selecting the ratio of a gearbox of a vehicle. The device according to the invention is used in combination with a motor vehicle having an engine, a mechanical clutch and a direct drive gearbox provided with an input shaft. Electronic means are provided for placing the speed of the engine under the control of the input shaft of the gearbox, and for introducing a parameter which takes into account the intentions of the driver of the motor vehicle. The device also includes a safety system which is operably and electronically connected to the electronic means for determining high and low speed limits of the vehicle for each said ratio. Such high and low speed limits for the ratio concerned correspond to the admissible maximum and minimum operating conditions, respectively, of the engine, while any overstepping of the range defined by such limits involves the change of the gearbox ratio systematically.

In accordance with the present invention, at the outset, the following hypotheses were assumed:

For a given value of the speed of the vehicle, it is possible to use certain ratios (generally, 1 or 2, sometimes 3).

The safety system indicates the ratios which are allowed to be used, the speed of the vehicle being taken into account, and is also a global selection system.

The driver, with a semi-automatic control, can select one of the ratios allowed. Any other selection would be of no effect.

The automatism will indicate the greatest or the smallest allowed ratio depending on the driver giving a sign of his intention of using the entire power of the engine, or only a part thereof.

The intention of operating at maximum power is materialized by a fleeting passage through the kick-down position (over-stroke of the accelerator pedal beyond the 4/4 or "full load" position). This fleeting action puts in storage the option of selecting the smallest allowed ratio.

The selection of the smallest allowed ratio, as obtained by a fleeting kick-down, allows retrograding or downshifting by one ratio and raising of the operator's foot from the accelerator pedal. This is an advantageous operating procedure when reaching a crossroad (this enables slowing down before reaching the dangerous area, and to re-accelerate with maximum power when crossing said area). Such an operating procedure is not possible with the usual kick-down, the action of which exists only if the accelerator pedal is held down on the vehicle floor.

The selection of the smallest ratio allowed, as imposed by the kick-down, must be deleted by appropriate means when the vehicle runs under ordinary conditions, wherein it is desirable to use the greatest ratio allowed, so as to limit the operating conditions of the engine, the noise, and the fuel consumption. That is, to do what a good driver would do.

An example of practical application of the above hypothesis about the selection of the gear ratio is illustrated by the accompanying drawing, which is given by way of non-limiting example and will enable the features of the present invention to be understood more clearly.

BRIEF DESCRIPTION OF THE DRAWINGS

FIG. 1 is a diagram showing the variation of the useful torque as a function of the speed of the engine.

FIG. 2 is a diagrammatic view of a device of selection and safety according to the invention, for the selection of the ratio of the gearbox.

DETAILED DESCRIPTION

With reference to FIG. 1, it should be noted that all diesel engines, and, in general, the big engines, are provided with a maximum speed regulator which limits the useful torque C from a speed $N_1$ (called "beginning-of-break speed"), and cancels it completely for a higher speed $N_2$ (called "end-of-break speed"). Considering a speed $N_3$, judiciously selected between the beginning $N_1$ and the end $N_2$ of the break by the regulator, it can be said that when said speed $N_3$ is reached, the torque supplied by the engine is only a known fraction (for instance, one-half) of its maximum torque. (FIG. 1).

A safety device for the selection of the gearbox ratio (FIG. 2) is constituted by:

(1) electronic circuits of selection which include:
  a memory 1 of ratio selection. This "memory" consists of two elementary memories Q and Q respectively inserted on a first circuit selecting the greatest allowed ratio, and on a second circuit selecting the smallest allowed ratio;
  a speed selector 2, which is controlled either automatically or manually;

electronic AND gate 3 and OR gate 4, the latter gate 4 supplying a signal which indicates or engages the selected ratio automatically;

connections mounted across an output of the selector 2 to transmit a signal to a circuit 5 of selection of the greatest ratio, or a circuit 6 of selection of the smallest ratio.

(2) — means 7 displaying the gearbox ratios allowed by the speed of the vehicle.

(3) — a safety circuit 8, intended to prohibit or allow the selection of a ratio of the gearbox. If the driver selects a ratio which is not allowed by said circuit, such selection comes up against the validation limits 9 defined by said safety circuit 8, and is of no effect.

(4) — alarm means 10, which are actuated, for instance, from a converter 11 at the time one of the safety thresholds 9 is crossed.

(5) — devices 12 and 12a which enables the introduction of a parameter imposed by the driver, said devices acting on the electronic control through the agency of the memory 1, and AND gates 13 or 14, each of which injects a signal on an OR gate 15, the output of which is connected to one of the inputs of the AND gate 3.

Two cases of operation will now be described, depending on whether the vehicle climbs a gradient, or runs on the level.

A — Case of the vehicle climbing a gradient.

Reference is made first to the diagram of FIG. 1. If, on a gradient, the vehicle reaches the reference speed $N_3$, then the torque $C_3$ required for propelling the vehicle is a known fraction of the maximum torque $C_M$ of the engine. If said fraction has been selected while taking the range of ratios of the gearbox into account, then it is certain that with the next higher ratio the engine will be able to propel the vehicle by producing its maximum torque. The system illustrated in FIG. 2 allows then (for $N \geq N_3$) to pass to the higher ratio.

The change of ratio will then be brought about automatically by the disappearance of the authorization of using the ratio engaged, which is the smallest among those which are allowed. The device 6 for selection of the smallest ratio and the corresponding memory $\overline{Q}$ are then inhibited, while the memory Q and the device 5 for selection of the greatest ratio are "cocked" or set at the time the driver goes up by one ratio of the gearbox.

In FIG. 2, electronic signals at various locations of the circuit are indicated by: $x$ at the point of output of AND gate 13; by $y$ at the point of output of AND gate 14; by $z$ at the point of output of OR gate 15; by $v$ at one of the points of input (leading from speed selector 2) of AND gate 3; by $u$ at the point of output of AND gate 3; by $t$ at one of the points of input (leading from speed selector 2) of OR gate 4; and by $s$ at the point of output of OR gate 4.

The signals on the electronic gates of the control circuit are then at the following levels:

so that:
$$\begin{cases} x = 0 & \text{at the output of the AND gate 13} \\ y = 1 & \text{at the output of the AND gate 14,} \\ z = 1 \\ v = 1 & \text{(automatic operation) at the inputs of AND gate 3} \end{cases}$$
that is,
$$\begin{cases} u = 1 \\ t = 0 & \text{at the input, and } s = 1 \text{ at the output of OR gate 4.} \end{cases}$$

When, on the other hand, the driver wants to retrograde or downshift the ratio as quickly as possible (for instance, before reaching a rising gradient or a crossroad), he acts on the fleeting kick-down 12 to "re-cock" or re-set the memory $\overline{Q}$ for selection of the smallest ratio. The following values are then obtained:

$$\begin{cases} x = 1 \\ y = 0 & \text{(the AND gate 14 is inhibited)} \\ z = 1 \\ v = 0 & \text{(manual section of the range allowed)} \\ u = 0 \\ t = 1 & \text{at the input, and } s = 1 \text{ at the output of the OR gate 4} \end{cases}$$

B — Case of the vehicle running on the level.

In this case, it is necessary to pass to the higher allowed ratio as soon as the engine torque is definitely greater than the torque required for a constant speed propulsion, that is, when the acceleration obtained is sufficiently great.

If the acceleration $\gamma$ is great, the ratio is changed before the reference speed $N_3$ in the "break" area is reached. This is obtained through an acceleration level detector.

In FIG. 2, the designation $\gamma_n$ represents the acceleration obtained when sufficient torque is present for constant speed propulsion in a lower ration $n$. The designations $w$ and $w'$ represent the electronic signals at the two input points of OR gate 12a which lead from the acceleration level detector. If $\gamma > \gamma_n$, a signal $w = 1$ is emitted by said detector, and is injected on an OR gate 12a. The output $\tau = 1$ sets the memory Q for selection of the greatest allowed ratio, and inhibits the memory $\overline{Q}$ for selection of the smallest allowed ratio.

The driver then passes from the ratio $n$ to the upper ratio $n + 1$. The acceleration drops down to $\gamma' < \gamma_n$, and, as a result, $$\begin{cases} w = 0 \\ w' = 1, \text{ and } \tau = 1, \end{cases}$$

so that the greatest ratio allowed is kept: the driver may still intervene (through the kick-down 12) in order to retrograde or downshift while maintaining the maximum power. The testing means for testing the possibility of engaging a higher ratio and keeping to it may include means for picking up the speed of rotation of the engine and emitting a signal when such pick-up means records that the instantaneous speed of the engine is at a predetermined value in the "break" range defined by the regulator of the flow of the fuel pump of the engine of the motor vehicle. The pick-up means can measure the speed of rotation of the engine indirectly by calculation from the road speed of the vehicle and from the ratio engaged in the gearbox before the operation.

There is herein incorporated by reference the disclosure of the commonly-assigned copending U.S. patent application, Ser. No. 479,537 filed on June 14, 1974, naming Jean-Paul Sibeud as inventor, entitled "DEVICE WITH A JACK FOR CONTROLLING A GEARBOX SYNCHROMESH, AND METHOD FOR USING SAME" (MBJ-127-A); and commonly-assigned copending U.S. patent application, Ser. No. 495,061 filed on Aug. 5, 1974 naming Jean-Paul Sibeud as inventor and entitled "METHOD AND DEVICE FOR ASCERTAINING THE STATE OF A GEARBOX, IN PARTICULAR IN A MOTOR VEHICLE" (MBJ-132-A); and commonly-assigned copending U.S. patent application, Ser. No. 469,232 filed on May 13, 1974 naming Jean-Paul Sibeud as inventor and entitled "AUTOMATIC CLUTCH DEVICE FOR MOTOR VEHICLES" (MBJ-126-A); and commonly-assigned French patent application No. 7411917 filed on Mar. 29, 1974 naming Jean-Paul Sibeud and Jean-Marie Noyer as inventors and entitled "DEVICE FOR CHANGING THE GEARS AUTOMATICALLY ON A SYNCHRONIZED GEARBOX" (MBJ-146-A). The disclosure of all of the aforementioned applications is hereby incorporated herein by reference thereto.

I claim:

1. A device for selecting the ratio of a gearbox of a vehicle, comprising, in combination:

a motor vehicle having an engine, a mechanical clutch, and a direct drive gearbox;

said gearbox having an input shaft;

electronic means for placing the speed of said engine under the control of said input shaft of said gearbox, and for introducing a parameter which takes into account the intentions of the driver of said motor vehicle, said electronic means including memory means for memorizing said parameter imposed by said driver;

a safety system operably and electronically connected to said electronic means for determining high and low speed limits of said vehicle for each said ratio and including indicator means and warning means which are actuated when one of said limits is overstepped upon a variation in the operating condition of said engine;

said high and low speed limits for the ratio concerned correspond to the admissible maximum and minimum operating conditions, respectively, for said engine, while any overstepping of the range defined by said limits involves the change of the gearbox ratio systematically; and means for enabling the driver to select the smallest allowed ratio, including a transitory stop or kickdown device which is operated by a fleeting overstroke of the accelerator pedal in order to enable the driver to retrograde as much as possible; and the retrogradation control having been memorized by said memory means, while the passage to the smallest allowed ratio as imposed by said kickdown device is cancelled either when passing to a higher speed ratio, or when the device detects an acceleration beyond a certain limit which corresponds to the possibility of engaging the higher ratio when it is desirable to use the greatest ratio compatible with the safety system in order to limit the operating conditions of said engine.

2. A device according to claim 1, including:

memory means which cancel the action of the kickdown device automatically when the selection of the smallest ratio is not advantageous.

3. A device according to claim 1, including:

means for testing the possibility of engaging a higher ratio and keeping to it;

said testing means including means for picking up the speed of rotation of said engine and for emitting a signal when such pick-up means records that the instantaneous speed of said engine is at a predetermined value in the "break" range defined by the regulator of the flow of the fuel pump of said engine of said motor vehicle; and said pick-up means measures the speed of rotation of said engine indirectly by calculation from the road speed of said vehicle and from the ratio engaged in said gearbox before the operation.

4. A device according to claim 1, including:

an acceleration detector which compares the level of the acceleration with a predetermined limit which is a function of the torque required by said engine for the propulsion of said vehicle; and the overstepping of said predetermined limit bringing about the cancellation of the memory of selection of the smallest allowed ratio.

* * * * *